United States Patent
Andersson

(10) Patent No.: US 7,710,875 B2
(45) Date of Patent: May 4, 2010

(54) CONGESTION CONTROL IN A WIRELESS MOBILE SYSTEM

(75) Inventor: Bengt Andreas Andersson, Landvetter (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 347 days.

(21) Appl. No.: 11/719,021

(22) PCT Filed: Nov. 10, 2004

(86) PCT No.: PCT/SE2004/001629

§ 371 (c)(1),
(2), (4) Date: May 10, 2007

(87) PCT Pub. No.: WO2006/052169

PCT Pub. Date: May 18, 2006

(65) Prior Publication Data

US 2008/0089229 A1    Apr. 17, 2008

(51) Int. Cl.
  H04L 12/26 (2006.01)
  H04W 4/00 (2006.01)
  H04W 72/00 (2006.01)
(52) U.S. Cl. .............. 370/235; 455/422.1; 455/452.2; 455/453
(58) Field of Classification Search .......... None
See application file for complete search history.

(56) References Cited

U.S. PATENT DOCUMENTS

| 2004/0072565 | A1 | 4/2004 | Nobukiyo et al. |
| 2004/0208183 | A1* | 10/2004 | Balachandran et al. .. 370/395.21 |
| 2005/0107091 | A1* | 5/2005 | Vannithamby et al. ...... 455/453 |
| 2005/0233754 | A1* | 10/2005 | Beale ....................... 455/452.2 |
| 2006/0084389 | A1* | 4/2006 | Beale et al. .............. 455/67.11 |
| 2007/0014263 | A1* | 1/2007 | Ferrato et al. ................ 370/335 |

FOREIGN PATENT DOCUMENTS

| EP | 1448012 A2 | 8/2004 |
| KR | 1999-53170 | 7/1999 |
| KR | 2003-23082 | 3/2003 |

* cited by examiner

Primary Examiner—Ricky Ngo
Assistant Examiner—Clemence Han

(57) ABSTRACT

The invention refers to a method for improved congestion control in a wireless mobile system where a high speed packet data access (HSDPA) between a node and a number of mobile stations (MS) have been established by dedicating a high speed physical downlink shared channel (HS-PDSCH) to all mobile stations (MS) and one associated dedicated channel (A-DPCH) per each mobile station (MS). The method comprises the steps of; CON-in case of congestion, detecting the amount of download data still to be downloaded by each of the mobile stations (MS) and, -based on the amount of download data still to be downloaded, releasing the associated dedicated channel (A-DPCH) for one or more first mobile stations (MS) having an amount of data above a predetermined threshold level.

4 Claims, 2 Drawing Sheets

CONGESTION CONTROL IN A WIRELESS MOBILE SYSTEM

TECHNICAL FIELD

The invention refers to a method for improved congestion control in a wireless mobile system and a control device arranged to carry out the method. The method is used in a wireless mobile system where a high speed packet data access has been established between a node and a number of mobile stations by dedicating a high speed physical downlink shared channel to all mobile stations and one associated dedicated channel per each mobile station.

BACKGROUND ART

Abbreviations:
3GPP—3$^{rd}$ Generation Partnership Project (standards body)
A-DPCH—Associated Dedicated Physical Channel
DL—DownLink
FDD—Frequency Division Duplex
GGSN—Gateway GPRS Support Node
GPRS—General Packet Radio System
GSM—Global System for Mobile Communications
HSDPA—High Speed Downlink Packet Access
HS—PDSCH High Speed Physical Downlink Shared CHannel
LLC—Logical Link Control
MAC—Medium Access Code
MS—Mobile station
PDP—Packet Data Protocol
RLC—Radio Link Control
RNC—Radio Network Controller
SGSN—Serving GPRS Support Node
SNDCP—Sub Network Dependent Convergence Protocol
TCP—Transport
TDD—Division Duplex
UL—UpLink
UMTS—Universal Mobile Telecommunications System
UTRAN—UMTS Terrestrial Radio Access Network
WCDMA—Wide band Code Division Multiple Access The 3rd Generation Partnership Project (3GPP) specification is a standard for the third generation mobile telephony system. The system supports different user data rates for different users. The transmission power used for a certain user is determined by interference level in a certain cell, user data rate, channel quality and requested quality of the data transmission in the cell.

Control channels and traffic channels are referred to as logical channels. These logical channels are mapped onto physical channels.

A physical channel can be a radio broadcasting frequency, a pair of frequencies (including duplex separation) in an analog mobile system or a time slot on a pair of frequencies in a digital mobile system.

A physical channel may, for example, be a time slot on a particular frequency channel in a TDMA system and may also be said to be a carrier of a logical channel, such as a traffic channel (sometimes abbreviated TCH), or several logical channels, such as various control channels in a multi frame structure.

In digital systems based on TDMA the mapping process means that a time slot and a frequency are allocated to the traffic burst.

The traffic channels convey voice or data (such as Internet traffic) between the mobile and base station. The channels are allocated on a per call basis. Ordinarily, a time slot is used for one call only (full rate), but an alternative with two calls per time slot (half rate) has also been specified.

All the present mobile systems are based on multiple access, which means that all users have simultaneous access to the medium. This requires a number of rules to prevent situations in which mobiles "all talk at the same time". The medium, which is a common resource, must satisfy the needs of all users.

Traffic channels are assigned through control-channel signalling.

Each cell in a cellular system can be regarded as an individual medium because a mobile leaving the cell loses contact with that cell's base station. However, all mobiles in the cell utilise the same radio resource, namely, that portion of the frequency spectrum which has been assigned to the cell.

One technique for channel multiplexing using multiple access is CDMA (Code division multiple access). CDMA systems are capable of transmitting and receiving over the entire frequency band and a "third dimension" is used to separate traffic channels, namely, coding.

A typical feature of the CDMA technique is that all mobiles in the network are assigned a unique code: a chip sequence. When a mobile wishes to transmit a bit stream, it replaces every bit with its code (for ones) or with the code's ones complement (for zeros). The result is that a number of air interface bits (referred to as a "chip"), depending on the spreading factor used, are transmitted for every payload bit. Provided that the same modulation methods are used as those used in TDMA, the required bandwidth will be correspondingly larger. Instead of using some tens of kHz for a voice channel, the chip will be modulated over approximately 3.84 MHz. That is why this technique is also referred to as a spread-spectrum technique.

The mobile telephone system may, for example, be a WCDMA system which has a downlink transport channel called High Speed Downlink Shared Channel (HS-DSCH) mapped onto a set of physical channels called High Speed Physical Downlink Shared CHannels (HS-PDSCH). The HS-DSCH provides enhanced support for interactive, background, and, to some extent streaming radio-access-bearer (RAB) services in the downlink direction.

In a HSDPA supporting WCDMA system (e.g. according to 3GPP release 5) every user that is given access to a HS-PDSCH (High Speed Physical Downlink Shared Channel) channel must also have an associated dedicated Physical Channel A-DPCH used, for example, for communicating control information.

A typical action in case of overload (congestion) consists of the Radio Network Controller RNC releasing certain channels to reduce the load on the particular resource that is in shortage, for example DL Power, UL interference, DL Codes, etc. It is possible that also A-DPCHs will be released, especially if all interactive/background traffic is carried on HS-PDSCH and there's a need to make more DL Codes available to handle a sharp increase in conversational traffic (speech, video, . . . ) or if it turns out that A-DPCHs consume a significant amount of power.

Current congestion control randomly selects the A-DPCHs to be released for certain mobile stations and thereby inhibiting the downlink information flow in the HS-PDSCH for the thereby randomly chosen mobile station. This can lead to a situation where a user that is almost done with a download is thrown out of the system at the expense of a user that has just got into the system. As an end user, this can be very annoying, especially if the application gives some kind of indication of the progress of the download (one case could be that the end user can see that the down load is 95% completed and then interrupted).

Therefore, there is a need for an improved congestion control in a HSDPA based system or the like, with enhanced data transmission flow control giving more pleased users.

DISCLOSURE OF INVENTION

The invention intends to remedy the above problems by a method for improved congestion control and a control device arranged for carrying out the method.

The method is used in a wireless mobile system where a high speed packet data access HSDPA has been established between a node and a number of mobile stations MS by dedicating a high speed physical downlink shared channel HS-PDSCH to all mobile stations MS and one associated dedicated channel A-DPCH per each mobile station MS. The above HSDPA setup may be performed by the node.

The method comprises the steps of:
  in case of congestion, a control device detecting the amount of download data still to be downloaded by each of the mobile stations MS and,
  based on the amount of download data still to be downloaded, the control device releasing the associated dedicated channel A-DPCH for one or more first mobile stations MS having an amount of data above a predetermined threshold level.

The advantage of the invention lies in that the mobile stations that are almost finished downloading, are allowed to finish downloading, instead of as in prior art being randomly thrown out regardless of status.

In one embodiment of the invention, the threshold level is an amount of download data to be downloaded by one or several second mobile stations MS using the same high speed physical downlink shared channel HS-PDSCH as the first mobile station(s). In this embodiment the threshold is set by comparing all mobile stations and to release the A-DPCH for one or several user units having more data to be downloaded than at least another mobile station. The comparison may give a hierarchy with the mobile station having the most data to be downloaded at the top and the mobile station with the least data at the bottom. The threshold may here be a floating value that is always set at the mobile station having the second most data to download, i.e. mobile station No two in the hierarchy. The advantage here is that the mobile station having the most still to download will be thrown out in a first round, and during the next round the next in order is thrown out if more recourses have to be liberated, while all the other mobile stations may continue downloading and the mobile stations having the least to download is thus given a chance to finish downloading. The threshold level may also be set at a level indicating a specific mobile station in the hierarchy and all the mobile stations above that mobile station in the hierarchy may be subject to the release of the associated the A-DPCH.

In one embodiment of the invention, the threshold level is a preset value, for example, all mobile stations having downloaded more than a certain percentage of an intended amount may continue and the other mobile stations may be subject to the release of the associated the A-DPCH.

The wireless mobile system may be a WCDMA based system wherein the node being an RNC. However, the invention is applicable on all systems using a downlink shared channel and an associated dedicated channel that always consumes an amount of the total system recourse, for example for control information. As referred to in the prior art description, HS-PDSCH and A-DPCH refers to a WCDMA system, but the present invention may be applicable in, for example, CDMA 2000 1x, EVDO (EVolution Data Only) and EVDV (EVolution DataNoice), where the HS-PDSCH is denoted F-PDCH (Forward link Packet Data CHannel) and the corresponding A-DPCH is denoted F-FCH (Forward link Fundamental CHannel). CDMA 2000 refers to the 3GPP2 and the EVDO and EVDV corresponds to the HSDPA system in the 3GPP3 based WCDMA system. The invention may also be used in any other FDMA and/or a TDMA based system with a similar channel configuration as the WCDMA or CDMA 2000.

In one embodiment the threshold level is a preset value of not yet acknowledged data in an RLC in the RNC. The not yet acknowledged data may be detected by looking in the RLC buffers, where it would be possible to find users with low amounts of not yet acknowledged data. The threshold may then be defined in bytes. The most straightforward way to use this information would be to define the threshold such that mobile stations with less remaining data than this threshold are protected at least in a first round of releasing A-DPCHs.

If there's a proxy in the RNC, information from this proxy could be passed over an RNC internal interface to a radio resource management function in a control device taking the decision on which A-DPCH to be released. The radio resource management function is preferably a part of the RNC.

It would of course also be possible to combine this criterion with other criteria such as detection of power usage of the individual Radio Link. The not yet acknowledged data may also be used for the above described comparison between different mobile stations.

The basic idea of the invention is thus to find/detect users that have very little data waiting for transmission and the benefits is an improved end user experience for wireless data services in a WCDMA or another similar system using a HSDPA supporting network or a network similar to HSDPA.

In principle the same mechanisms can be considered also for interactive or background traffic on dedicated channels as well, but the gain is assumed to be lower.

The invention refers also to a control device for improved congestion control in a wireless mobile system where a high speed packet data access (HSDPA) between a node and a number of mobile stations (MS) have been established by a high speed physical downlink shared channel (HS-PDSCH) being dedicated to all mobile stations (MS) and one associated dedicated channel (A-DPCH) being dedicated per each mobile station (MS),
  in case of congestion, the control device being arranged to detect the amount of download data still to be downloaded by each of the mobile stations (MS) and,
  the control device being arranged to, based on the amount of download data still to be downloaded, release the associated dedicated channel (A-DPCH) for one or more first mobile stations (MS) having an amount of data above the predetermined threshold level.

All the above stated advantages with the method is also valid for the control device.

The control device is preferably a part of the RNC and may be arranged to carry out all the above stated method steps.

BRIEF DESCRIPTION OF DRAWINGS

The invention will below be described in more details in connection to a number of drawings, where.

EMBODIMENTS OF THE INVENTION

Figure 1:
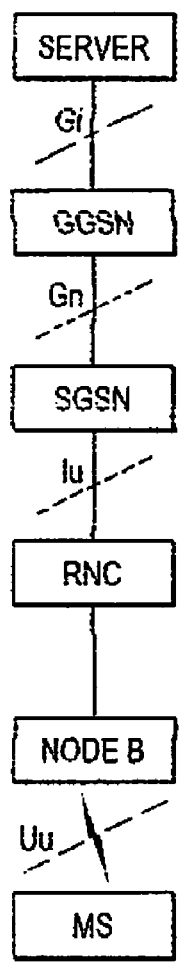
FIG. 1 schematically shows a TCP/IP based network in a GPRS standard according to one embodiment of the present invention.

FIG. 1 schematically shows a TCP/IP based network in a GPRS standard according to one embodiment of the present invention. The network comprises a landline based network a wireless radio network. The land line based network comprises a host in the form of a SERVER and a GGSN and a SGSN. The radio network comprises an RNC, a Node B and a client in the form of an MS, all based on WCDMA, see also FIG. 2. The interface between the GGSN and the SGSN is called Gn, and the interface between the SGSN and the RNC is called Iu. The interface between the MS and the Node-B in the second radio network is called $U_v$. The interface between the GGSN and the SERVER is called $G_i$.

Figure 3:
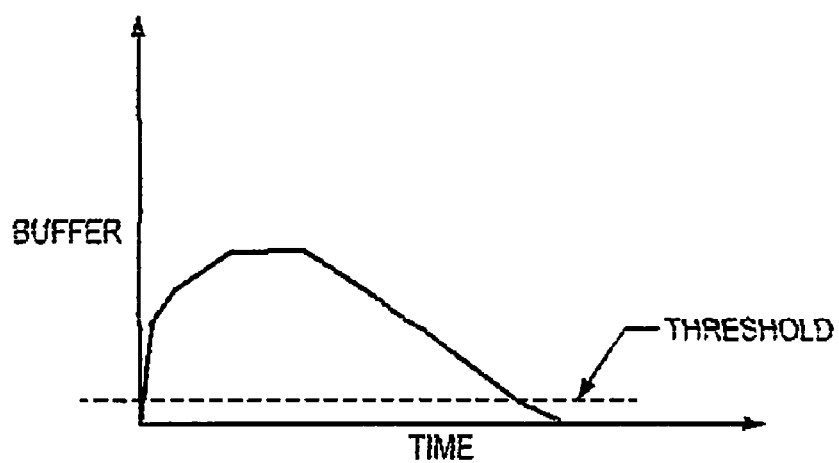
FIG. 3 shows a diagram over a buffer versus time.
Figure 2:
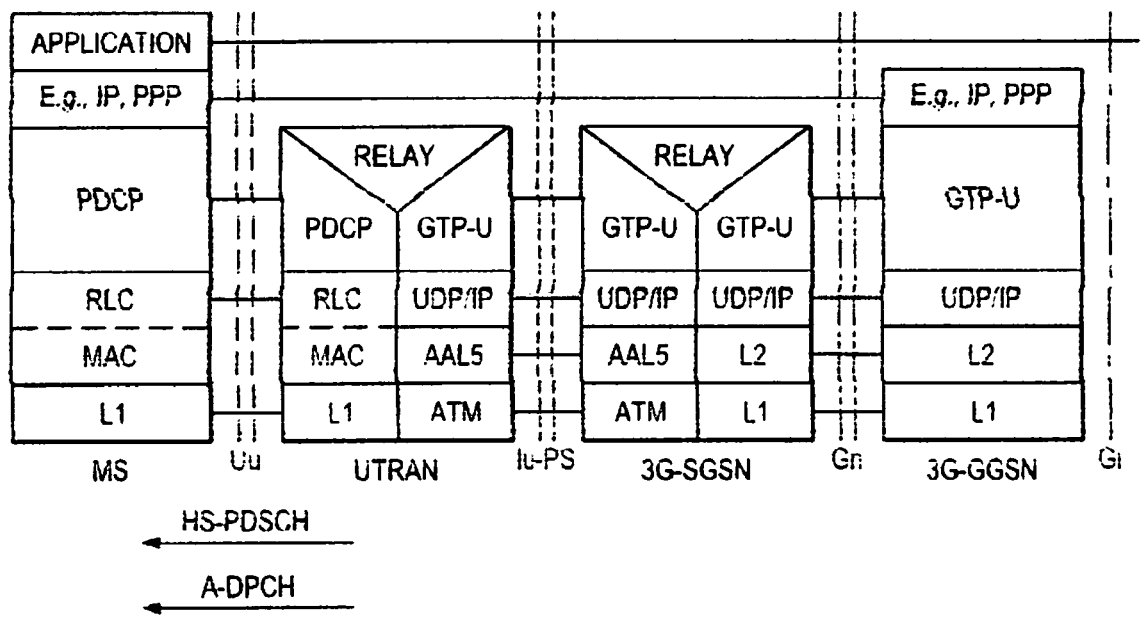
FIG. 2 schematically shows different stacked protocols of the GGSN over the Gn interface to the SGSN and the SGSN over the Iu interface to the MS, and where.

When discussing FIG. 1, cross-references are made to FIG. 2. FIG. 2 schematically shows different stacked protocols of the GGSN over the Gn interface to the SGSN and the SGSN over the Iu interface to the MS. In FIG. 3, UTRAN refers to the RNC and the Node-B in FIG. 1.

The GGSN refers to a gateway GPRS support node acting as an interface between the GPRS backbone network and the external packet data networks (radio network and the IP network). It converts the GPRS packets coming from the SGSN into the appropriate packet data protocol (PDP) format (e.g. IP) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN also performs authentication and charging functions towards external systems, whereas SGSN may perform authentication.

The function of the SGSN is as a router in the interface between the wireless network and the land line based network and has been explained above.

WCDMA technology is used for UTRAN air interface. UMTS WCDMA is a Direct Sequence CDMA system where user data is multiplied with quasi-random bits derived from WCDMA Spreading codes. In UMTS, in addition to channelisation, Codes are used for synchronisation and scrambling. WCDMA has two basic modes of operation: Frequency Division Duplex (FDD) and Time Division Duplex (TDD).

The functions of the Node-B are:
Air interface Transmission/Reception
Modulation/Demodulation
CDMA Physical Channel coding
Micro Diversity
Error Handing
Closed loop power control
The functions of the RNC are:
Radio Resource Control
Admission Control
Channel Allocation
Power Control Settings
Handover Control
Macro Diversity
Ciphering
Segmentation/Reassembly
Broadcast Signalling
Open Loop Power Control In the radio interface Iu in the RNC for UMTS GPRS, concentration is performed in the radio air interface Iu, because the number of traffic channels is limited.

The invention refers to a method for congestion control where the dedicated channel A-DPCH is released for some specific mobile stations. These mobile stations have an amount of information to download above a set threshold level. In order to find those mobile stations, a search for mobile stations below the threshold level reveals mobile stations that shall not be released, at least not in a first round of sorting out. By looking at RLC buffers in the RNC (See for example FIGS. 2 and 3.), it is possible to find mobile stations with low amounts of not yet acknowledged data, which is a sign that the mobile stations have downloaded the main part of the information, and that these mobile stations should be prioritised and not be thrown out by releasing the mobile stations corresponding A-DPCH if there are other mobile stations having a higher amount of not yet acknowledged data.

If there's a proxy in the RNC, information from this proxy could be passed over some RNC internal interface to the radio resource management function. The proxy is sometimes proposed as a means to hide the radio network from the application by intermediate buffering of data.

FIG. 3 shows a diagram over a buffer versus time in an RLC for a not yet acknowledged data. The Amount of not yet acknowledged data is rising considerably in the first part of the downloading process and then attenuates towards zero. In FIG. 3 a threshold is set at a predetermined level. All the mobile stations MS having not yet acknowledged data above the threshold is subject for being disrupted by cancelling the corresponding A-DPCH for that user. As can be seen in FIG. 3, the mobile stations just started to download is also below the threshold and will not be thrown out. This is of course not a desired situation, but the not yet acknowledged data is rising very fast so the mobile station will quickly be one of the mobile stations above the threshold level and thus subject for releasing the corresponding A-DPCH.

The invention claimed is:

1. A method for improved congestion control in a wireless mobile system wherein a high speed packet data access (HSDPA) is established between a node and a number of mobile stations (MS) by dedicating a high speed physical downlink shared channel (HS-PDSCH) to all mobile stations (MS) and one associated dedicated channel (A-DPCH) per mobile station (MS), said method comprising the steps of:

detecting with a control device, in case of congestion, the amount of download data still to be downloaded by each of the mobile stations; and, releasing by said control device, based on the amount of download data still to be downloaded, the associated dedicated channel (A-DPCH) for one or more first mobile stations having an amount of data above a predetermined threshold level, wherein the threshold level is an amount of download data to be downloaded by one or more second mobile stations using the same high speed physical downlink shared channel (HS-PDSCH) as said one or more first mobile station.

2. The method according to claim 1, wherein the wireless mobile system is a wide band code division multiple access (WCDMA) based system and wherein the node is a radio network controller (RNC), said RNC comprising the control device.

3. A control device for improved congestion control in a wireless mobile system wherein a high speed packet data access (HSDPA) between a node and a number of mobile stations (MS) is established by a high speed physical downlink shared channel (HS-PDSCH) dedicated to all mobile stations (MS) and one associated dedicated channel (A-DPCH) per mobile station, comprising:
- means operative, in case of congestion, to detect the amount of download data still to be downloaded by each of the mobile stations; and,
- means operative, as a function of the amount of download data still to be downloaded, to release the associated dedicated channel (A-DPCH) for one or more first mobile stations having an amount of data above a predetermined threshold level, wherein the threshold level is an amount of download data to be downloaded by one or more second mobile stations using the same high speed physical downlink shared channel (HS-PDSCH) as said one or more first mobile station.

4. A control device according to claim 3, wherein the wireless mobile system is a wide band code division multiple access (WCDMA) based system and the node is a radio network controller (RNC).

* * * * *

UNITED STATES PATENT AND TRADEMARK OFFICE
CERTIFICATE OF CORRECTION

PATENT NO. : 7,710,875 B2 Page 1 of 1
APPLICATION NO. : 11/719021
DATED : May 4, 2010
INVENTOR(S) : Andersson It is certified that error appears in the above-identified patent and that said Letters Patent is hereby corrected as shown below:

In Column 1, Line 37, insert -- Time --, before "Division".

Signed and Sealed this

Thirteenth Day of July, 2010

David J. Kappos
*Director of the United States Patent and Trademark Office*